No. 897,451. PATENTED SEPT. 1, 1908.
R. H. BOWMAN.
DERRICK OR HOISTING MEANS.
APPLICATION FILED JUNE 8, 1908.
3 SHEETS—SHEET 1.
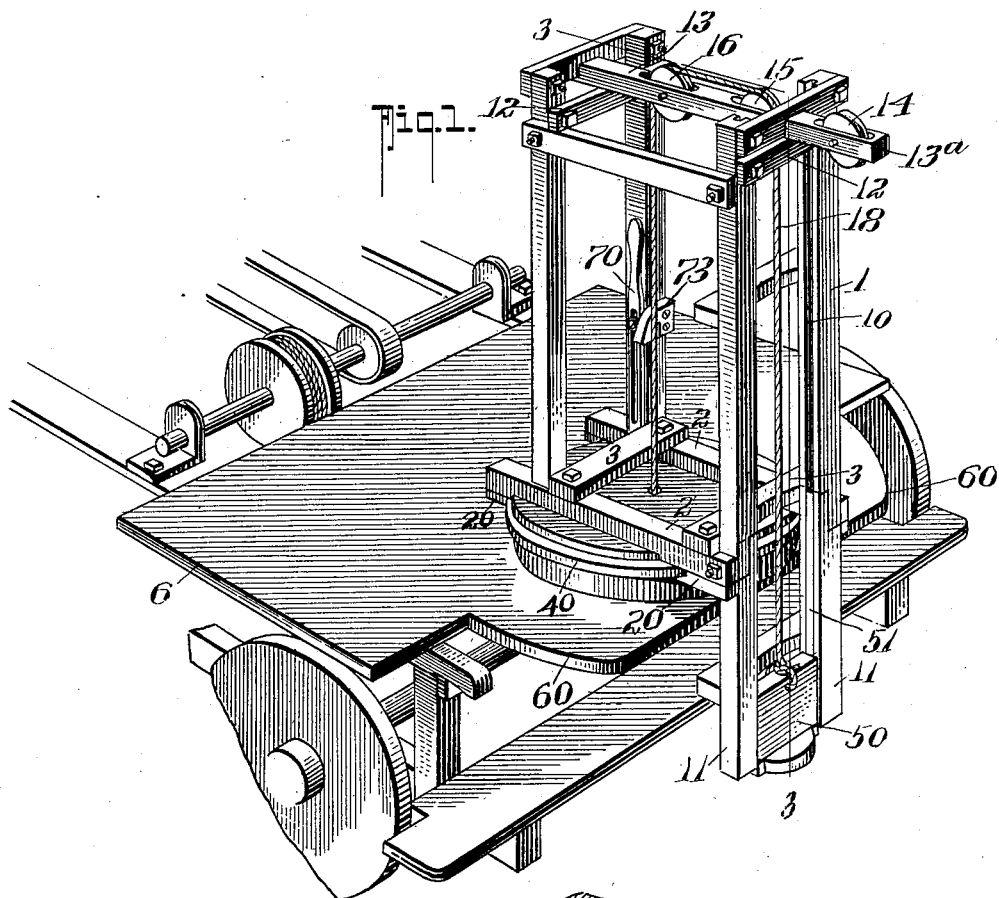
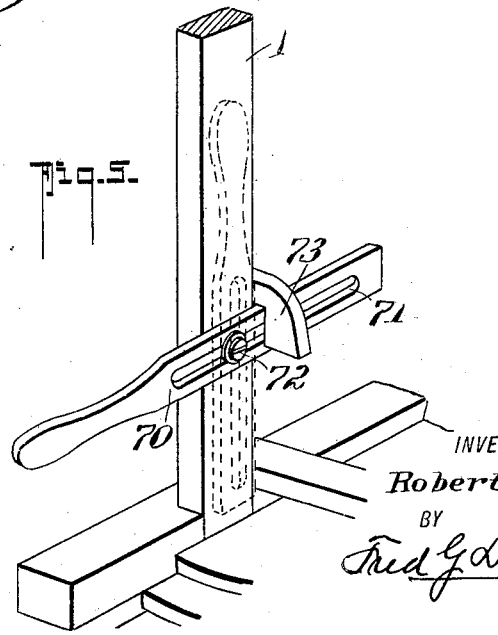
WITNESSES:
J. H. Woodard
Charles H. Wagner.
INVENTOR
Robert H. Bowman
BY
Fred G. Dieterich & Co.
ATTORNEYS

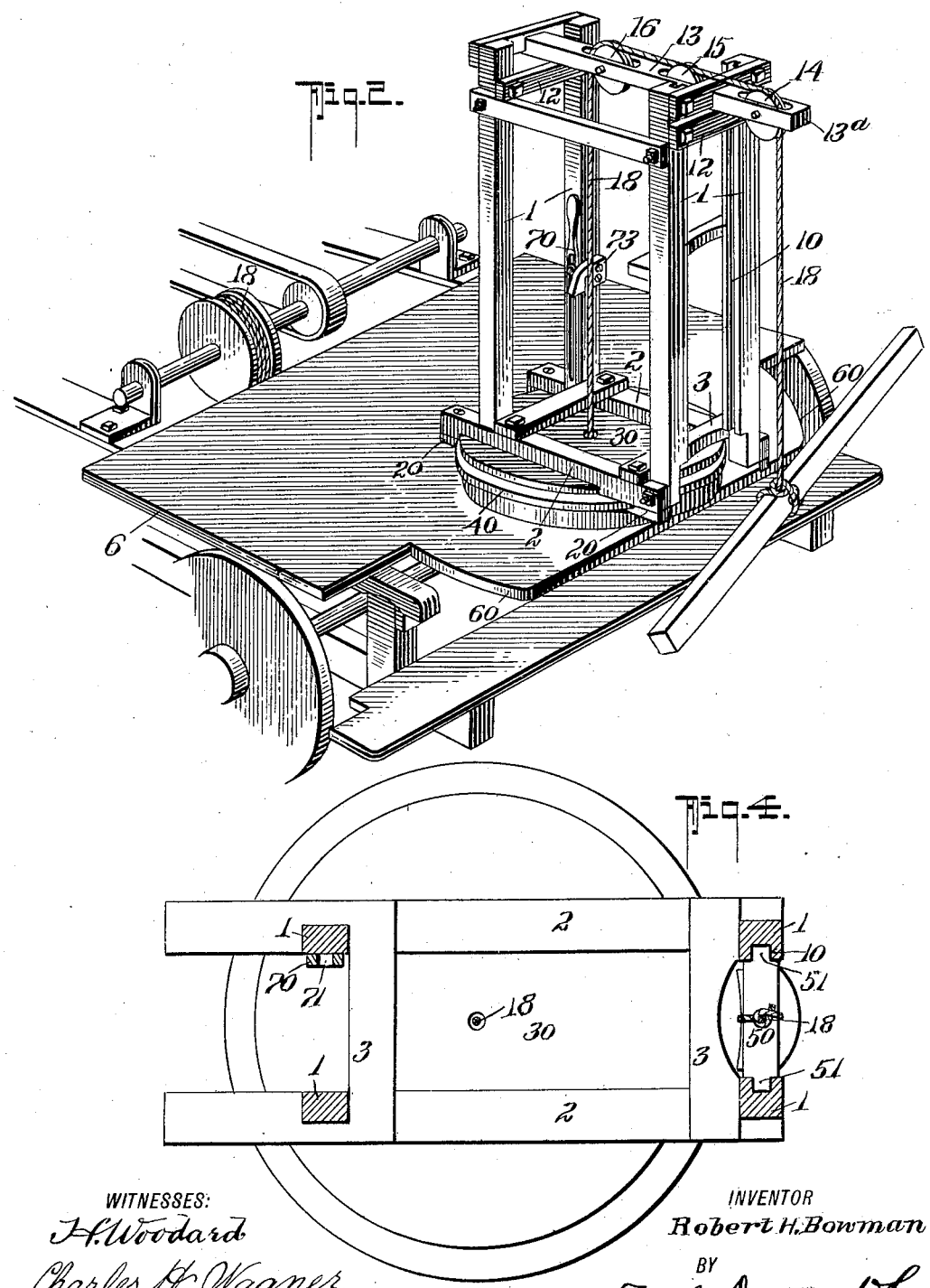

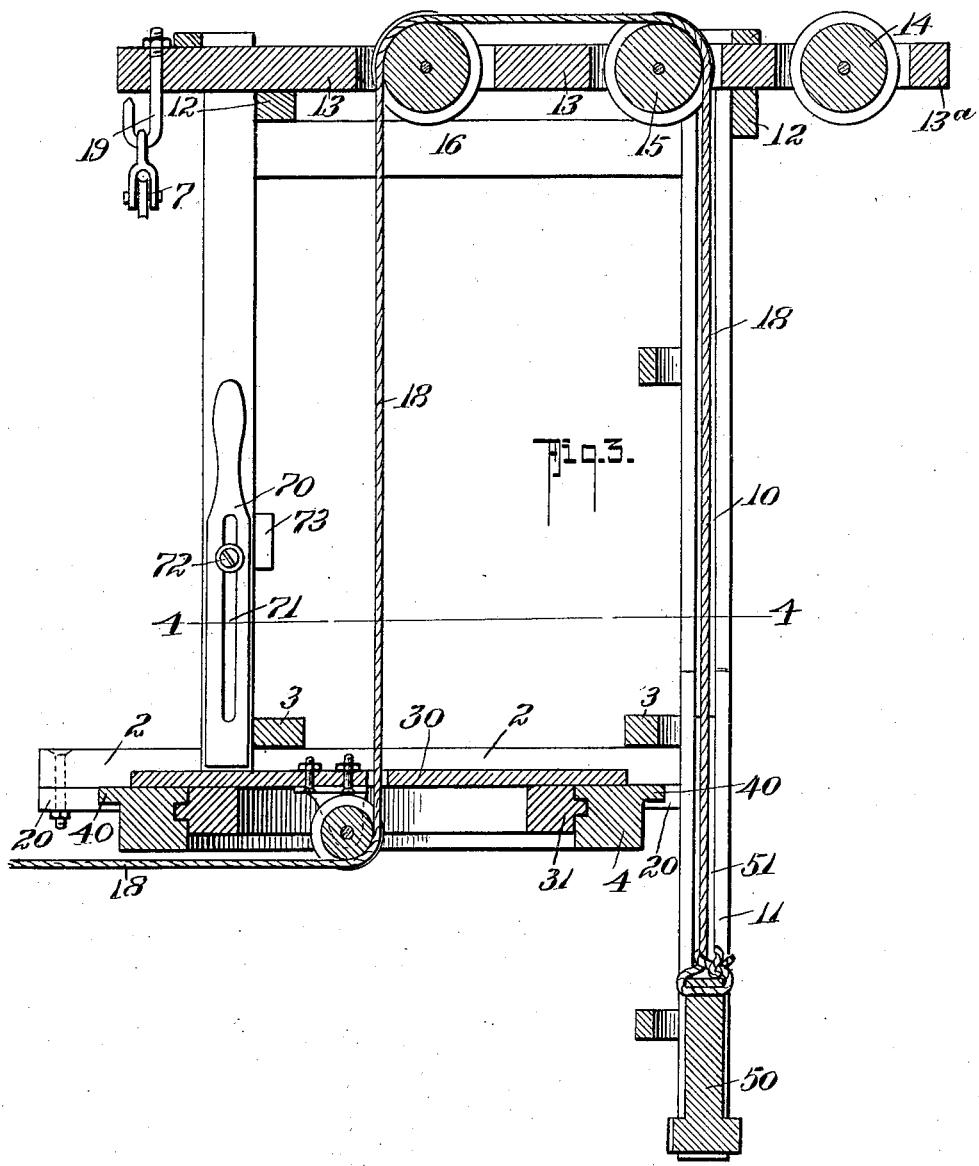

UNITED STATES PATENT OFFICE.

ROBERT HENRY BOWMAN, OF CANON CITY, COLORADO.

DERRICK OR HOISTING MEANS.

No. 897,451.  Specification of Letters Patent.  Patented Sept. 1, 1908.

Application filed June 8, 1908. Serial No. 437,358.

*To all whom it may concern:*

Be it known that I, ROBERT H. BOWMAN, residing at Canon City, in the county of Fremont and State of Colorado, have invented a new and Improved Derrick or Hoisting Means, of which the following is a specification.

My present invention has for its object to provide a simple and inexpensive means adapted for being mounted on a road wagon to serve as a derrick or hoist, and which can be readily mounted on the front end of a car or other vehicle for track work, or on the rear end of said car or other vehicle for road work, and my said invention consists in certain details of construction and peculiar combination of parts, all of which will be hereinafter fully explained, specifically pointed out in the appended claims and illustrated in the accompanying drawings, in which:—

Figure 1, is a perspective view of my improved construction of derrick, showing the same mounted on the front end of a motor vehicle and arranged as a pile driver. Fig. 2, is a similar view showing it mounted on the rear end of a wagon or car, the same being arranged as a hoist. Fig. 3, is a longitudinal section of the same, taken substantially on the line 3—3 on Fig. 1. Fig. 4, is a horizontal section taken on the line 4—4 on Fig. 3. Fig. 5, is a detail view of the adjustable turning handle hereinafter referred to.

In the practical construction, my present improvements embody a framing composed of four upright timbers 1, secured at their lower ends to a pair of longitudinally disposed base timbers 2 braced by cross pieces 3—3. The longitudinal timbers 2—2 are secured to a turn table 30 that has a pendent or ring flange 31 which rides in the circular guide or turn table base 4 that has a flange 40, with which engage the keeper guides 20 detachably secured at the ends of the timbers 2—2 as shown.
In the application of my invention, the turn table base is mounted on the end of the wagon or vehicle platform and is fixedly held thereon in any desirable manner and to facilitate the use of the pile driver or hoisting devices presently referred to, the outer ends of the wagon or vehicle platform 6 are rounded at the opposite sides 60, as clearly shown in the drawings. The platform of the wagon, where it supports the turn table, is large enough to extend over the wheels of the wagon so that the pile driver or hoisting means can be readily projected over the sides of the wagon and over the wheels.

The forward frame uprights 1—1 form the opposing vertical guides for a pile driver and to such end they each have a vertical groove 10—10 to receive the guide members 51 of the pile driver 50 which may be of the usual construction, and to facilitate the direction of the driver when the pile is near the ground, extension uprights 11—11 are detachably connected to the lower ends of the guides 10—10 as will be clearly understood by referring to Figs. 1, 2 and 3 of the drawings.

Mounted on the cross bars 12—12 of the upright framing is a longitudinal beam 13 that carries a pulley 14 at its front end 13ᵃ that projects beyond the pile driver guides and other guide pulleys 15 and 16, over which pass the cable 18, one end of which connects with the pile driver and the other end of which passes to a suitable pulling power, which may be an ordinary windlass or a winding drum attached to the engine that drives the motive power when the wagon is a motor driven one. The rear end of the beam 13 is also projected beyond the upright framing and it has a pendent hook 19 at such end to hang a sheave block 7 which can be utilized for hoisting purposes.

When the derrick is intended for use, as a simple hoisting means, the extension guides for the pile driver are removed and the derrick is mounted as shown in Fig. 2 and in this case the end of the cable can be readily looped for raising or lowering piles or other heavy timbers. When the pile driver extension is removed, the derrick frame can be turned entirely around and operated at any desired point.

70 designates a hand lever longitudinally slotted as at 71 to slidably engage a stud 72 on one of the frame uprights, to which is bolted a notched latch 73, with which the lever 70 engages when turned to the horizontal position, in which position it can be used for conveniently turning the derrick frame.

From the foregoing, taken in connection with the drawings, the advantages and the manner in which my present improvements are operated will be readily understood.

Having thus described my invention, what I claim and desire to secure by Letters Patent, is:—

1. A derrick or hoisting mechanism of the character described which comprises in combination with a wagon bed; a turn table mounted near one end of the wagon bed, a pair of front uprights and other uprights mounted on the turn table, the front uprights being relatively so positioned on the wagon bed whereby they can be projected beyond the end of the said bed, the said uprights, having their inner faces formed with guides for receiving a pile driver, pulley guides mounted on the upper ends of the uprights for the pile driver lift cable and other guides below the turn table for the pulley end of the said lift cable.

2. The combination with a wagon bed; of a turn table mounted on one end of the said bed, a pair of front uprights, mounted on the turn table and positioned at a point beyond the peripheral edge of the said turn table, said guides each having a vertical groove on the inner face for slidably receiving a pile driver, other uprights mounted on the turn table, guide pulleys mounted on the upper ends of the uprights, for the pile driver pull cable and supplemental pile driver guides adapted to be detachably secured on the lower ends of the front uprights when they are turned to project beyond the table end, as set forth.

3. A combined derrick and hoist for motor wagons and the like, comprising a turn table adapted for being mounted on the wagon bed and near one end thereof, base timbers mounted on the turn table and projected beyond the peripheral edge thereof, a pair of front and a pair of rear uprights mounted on the said base timbers, a longitudinal beam mounted on the upper edge of the upright and extended beyond the front face of the front uprights, a cable sheave mounted in the said extended portion, other guide pulleys or sheaves mounted on the said longitudinal beam, said front uprights having inside guide grooves for a pile driver, all being arranged substantially as shown and described.

4. The combination with a turn table, said turn table comprising an annular member having a horizontally projected peripheral flange, and adapted for being fixedly mounted on a wagon bed near one end thereof, a base member mounted to turn thereon, said base member including a pair of parallel horizontal bars whose ends project beyond the peripheral edge of the turn table, a pair of front and a pair of rear uprights mounted on the horizontal bars, the front ones on the projected front portion of the bars, cross beams that connect the upper ends of the uprights, a longitudinal beam mounted on the cross bars and having its ends projected beyond the bottom or base bars, supporting pulleys mounted in the outer ends of the said longitudinal beam and cable guide pulleys mounted on said beam midway the ends thereof, the front uprights having their inner opposing faces vertically grooved for receiving a pile driver.

5. The hereinbefore described improved derrick and hoist mechanism that consists of a ring shaped base member adapted to be secured upon a wagon bed near one end thereof and having a peripheral horizontal flange, a turn table having a pendent portion for fitting within the ring member, said turn table including a pair of parallel horizontal timbers, the ends of which extend beyond the ring shaped base member, clamp devices detachably secured to the timber extensions for engaging the horizontal flange on the ring member, a pair of uprights secured between one set of projected ends of the horizontal timbers, said uprights having their inner opposing faces vertically grooved, extension grooved guide members adapted for detachably connecting to the lower ends of the said grooved uprights, a pair of rear uprights mounted on the horizontal timbers, braces that connect the upper ends of the two sets of uprights, a longitudinal beam mounted on the braces and having its opposite ends projected beyond the front and rear uprights, a hoisting pulley mounted on each of the projected ends of the said longitudinal beam, cable sheaves mounted on the beam and a lever device mounted on the upright frame for turning it, as set forth.

ROBERT HENRY BOWMAN.

Witnesses:
J. M. BEANE,
GUY W. HARDY.